(12) United States Patent
Shi

(10) Patent No.: US 8,170,331 B2
(45) Date of Patent: May 1, 2012

(54) APPARATUS AND METHOD FOR PATTERN INTERPOLATION

(75) Inventor: Miaohong Shi, Tainan (TW)

(73) Assignee: Himax Imaging, Inc., Grand Cayman (KY)

( * ) Notice: Subject to any disclaimer, the term of this patent is extended or adjusted under 35 U.S.C. 154(b) by 1064 days.

(21) Appl. No.: 12/060,868

(22) Filed: Apr. 2, 2008

(65) Prior Publication Data
US 2009/0252408 A1 Oct. 8, 2009

(51) Int. Cl.
*G06K 9/00* (2006.01)

(52) U.S. Cl. ........................................ 382/162

(58) Field of Classification Search ............. 382/162, 382/165–167, 254, 300; 358/512, 518, 525; 348/273, 538–539, 612; 345/589, 606
See application file for complete search history.

(56) References Cited

U.S. PATENT DOCUMENTS

| | | | |
|---|---|---|---|
| 6,832,009 B1 * | 12/2004 | Shezaf et al. | 382/300 |
| 7,440,016 B2 * | 10/2008 | Keshet et al. | 348/280 |
| 7,940,282 B2 * | 5/2011 | Milanfar et al. | 345/606 |

* cited by examiner

*Primary Examiner* — Jose Couso
(74) *Attorney, Agent, or Firm* — Squire Sanders (US) LLP

(57) ABSTRACT

Apparatus and method for pattern interpolation are disclosed. Horizontally interpolated green, red and blue pixel values, and vertically interpolated green, red and blue pixel values are generated according to the pixels received from a pattern color filter. Subsequently, a direction is selected for the green value interpolation according to the horizontally and vertically interpolated pixel values.

10 Claims, 2 Drawing Sheets

APPARATUS AND METHOD FOR PATTERN INTERPOLATION

BACKGROUND OF THE INVENTION

1. Field of the Invention

The present invention generally relates to interpolation, and more particularly to Bayer pattern interpolation.

2. Description of the Prior Art

Each pixel of a color image can be represented as a vector of three components, such as the light intensity in red, green and blue wavelength bands of the visible spectrum. To reduce size and cost, however, in most imaging devices, each pixel is covered with an individual color filter which captures only one chromatic value. Subsequently, the full color values for each pixel can be interpolated from pixel values of the same color in local neighborhood. Bayer pattern (or mosaic) color filter array, FIG. 1, is one of popularly used color filter arrays. The Bayer pattern is designed on the basis that human eye is most sensitive to green, less to red, and least to blue. In the Bayer pattern, the number of green pixels is equal to the combined number of red and blue pixels. The interpolation performed on the image to retrieve a color image with three components per pixel is thus called Bayer pattern interpolation or demosaicing.

Even though its popularity in the image processing, the Bayer pattern interpolation has some drawbacks such as the color aliasing, in which high-frequency details misses, and, worst of all, the image is corrupted to appear as new frequencies.

Accordingly, a need has arisen to propose an efficient way for the Bayer pattern interpolation which significantly reduces the color aliasing.

SUMMARY OF THE INVENTION

In view of the foregoing, it is an object of the present invention to provide an efficient way for pattern interpolation, such as the Bayer pattern interpolation, which significantly reduces the color aliasing and improves the image quality especially along the edges and in the details of the image. Moreover, the computation effort required is less compared with conventional interpolations.

According to the embodiment of the present invention, horizontally interpolated green, red and blue pixel values, and vertically interpolated green, red and blue pixel values are generated according to the pixels received from a pattern color filter. Subsequently, a direction is selected for the green value interpolation according to the horizontally and vertically interpolated pixel values. The red and blue pixel values are then updated according to the selected interpolated green values.

DETAILED DESCRIPTION OF THE INVENTION

Figures 1, 2:
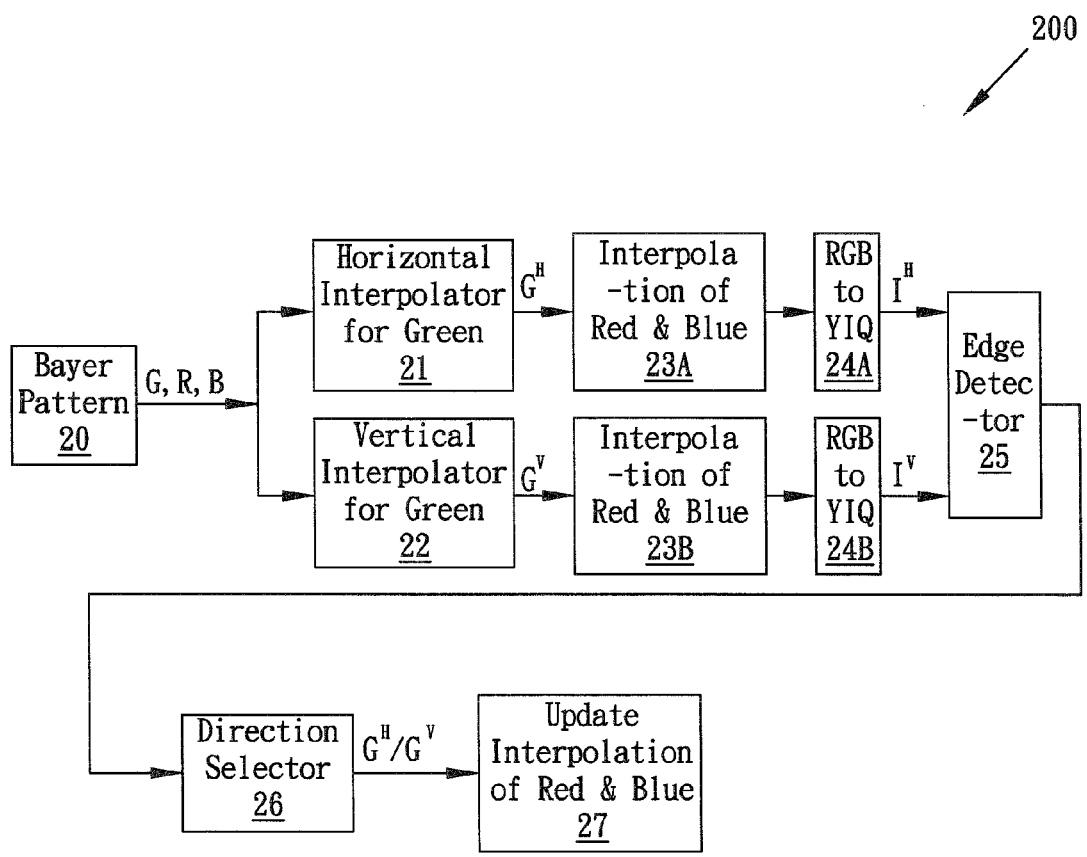
FIG. 1 shows the Bayer pattern (or mosaic) color filter array.
FIG. 2 shows a block diagram illustrating apparatus for pattern interpolation according to one embodiment of the present invention.
Figures 3, 4:
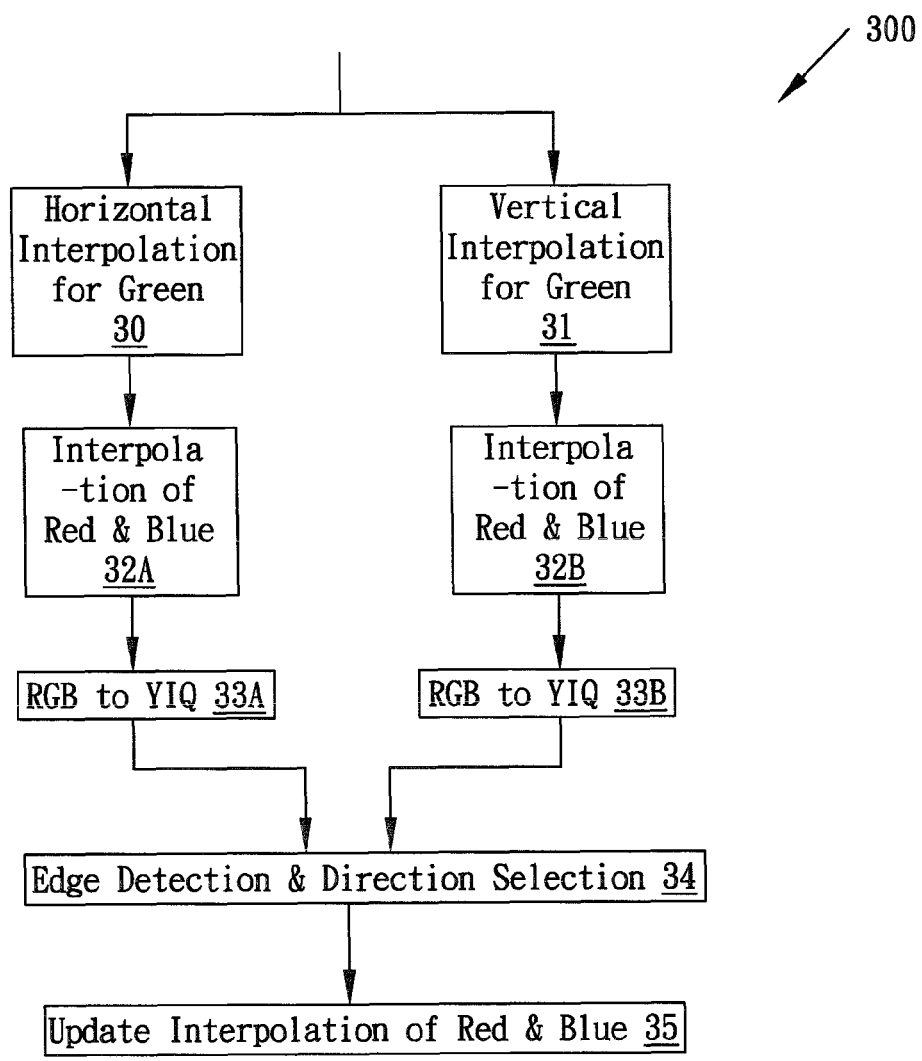
FIG. 3 shows a flow diagram illustrating a method for pattern interpolation according to the embodiment of the present invention.
FIG. 4 shows simplified pixels received from the Bayer pattern.

FIG. 2 shows a block diagram illustrating apparatus 200 for pattern interpolation according to one embodiment of the present invention, and FIG. 3 shows a flow diagram illustrating a method 300 for pattern interpolation according to the embodiment of the present invention. In the embodiment, the apparatus 200 and method 300 are utilized to improve the quality of an image being interpolated on the Bayer pattern (or mosaic) color filter array (the Bayer pattern hereinafter). Although the Bayer pattern interpolation is exemplified in the embodiment, however, the present invention could be applied, with or without modification, for interpolating other color filter array. In the embodiment, 8 bits are used for representing the pixel, and thus 256 levels (0-255) are available for the brightness. It is appreciated by those skilled in the art that the number of bits representing the pixel may be other than 8 in accordance with the design need of specific system.

In the embodiment, horizontal interpolation of green (step 30, FIG. 3) is firstly performed. Specifically, a horizontal interpolator for green (21, FIG. 2) performs horizontal interpolation of green values at red or blue pixels, such as those shown in FIG. 4, received from the Bayer pattern 20. In other words, horizontally neighboring green pixels are used to interpolate a specific pixel. In the embodiment, a bilinear interpolation method is utilized, while other interpolation methods may be used instead. One exemplary horizontal interpolation is expressed as follows:

Interpolate green at red pixel (2,2): $G_{2,2}^H = (G_{2,1} + G_{2,3})/2$

Subsequently, in 23A (FIG. 2) and step 32A (FIG. 3), we use bilinear interpolation of the difference between the red and the green to get the red value at green pixel (2, 3):

$$R_{2,3}^H = (R_{2,2} + R_{2,4})/2 + G_{2,3} - \frac{1}{2}G_{2,2}^H - \frac{1}{2}G_{2,4}^H$$

Interpolate red at green pixel (3, 2):

$$R_{3,2}^H = (R_{2,2} + R_{4,2})/2 + G_{3,2} - \frac{1}{2}G_{2,2}^H - \frac{1}{2}G_{4,2}^H$$

Interpolate red at blue pixel (3, 3):

$$R_{3,3}^H = (R_{2,2} + R_{2,4} + R_{4,2} + R_{4,4})/4 + G_{3,3}^H - \frac{1}{4}G_{2,2}^H - \frac{1}{4}G_{2,4}^H - \frac{1}{4}G_{4,2}^H - \frac{1}{4}G_{4,4}^H$$

While the example illustrated above illustrates the generation of red values using horizontally interpolated green values, similar operation can be done for generating blue values using horizontally interpolated green values.

Similarly, vertical interpolation of green (step 31, FIG. 3) is then performed. It is appreciated by a person skilled in the pertinent art that the performing order of the horizontal interpolation (step 30) and the vertical interpolation (step 31) may be altered, or even may be performed at the same time. In the vertical interpolation (step 31), a vertical interpolator for green (22, FIG. 2) performs vertical interpolation of green values at red or blue pixels received from the Bayer pattern 20. In other words, vertically neighboring green pixels are used to interpolate a specific pixel. One exemplary vertical interpolation is expressed as follows:
Interpolate green at red pixel (2, 2): $G_{2,2}^V = (G_{1,2} + G_{3,2})/2$ Subsequently, in 23B (FIG. 2) and step 32B (FIG. 3), we use bilinear interpolation of the difference between the red and the green to get the red value at green pixel (2, 3):

$$R_{2,3}^V = (R_{2,2} + R_{2,4})/2 + G_{2,3} - \frac{1}{2}G_{2,2}^V - \frac{1}{2}G_{2,4}^V$$

Interpolate red at green pixel (3, 2):

$$R_{3,2}^V = (R_{2,2} + R_{4,2})/2 + G_{3,2} - \frac{1}{2}G_{2,2}^V - \frac{1}{2}G_{4,2}^V$$

Interpolate red at blue pixel (3, 3):

$$R_{3,3}^V = (R_{2,2} + R_{2,4} + R_{4,2} + R_{4,4})/4 + G_{3,3}^V - \frac{1}{4}G_{2,2}^V - \frac{1}{4}G_{2,4}^V - \frac{1}{4}G_{4,2}^V - \frac{1}{4}G_{4,4}^V$$

While the example illustrated above illustrates the generation of red values using vertically interpolated green values, similar operation can be done for generating blue values using vertically interpolated green values.

After the horizontally interpolated pixel values $G^H, R^H, B^H$ and the vertically interpolated pixel values $G^V, R^V, B^V$ are generated, these pixel values are converted into YIQ color space (step 33A/33B) or other suitable color space by an RGB-to-YIQ converter 24A/24B. It is noted that color space other than YIQ may be used, or even the color space conversion may be omitted in some applications. In the embodiment, the conversion from interpolated R, G, B pixel values to I (which stands for "in phase") values in an 8-bit system is expressed as follows:

$$I_{i,j}^H = 0.596 * R_{i,j}^H - 0.2755 * G_{i,j}^H - 0.321 * B_{i,j}^H$$

where $I_{i,j}^H$ is the I value at pixel (i, j) calculated from horizontally interpolated R, G, B values at (i, j);

$$I_{i,j}^V = 0.596 * R_{i,j}^V - 0.2755 * G_{i,j}^V - 0.321 * B_{i,j}^V$$

where $I_{i,j}^V$ is the I value at pixel (i, j) calculated from vertically interpolated R, G, B values at (i, j).

The horizontal and vertical I values are subsequently utilized to detect the edge and then to select the direction for G interpolation (step 34) by an edge detector 25 and a direction selector 26, respectively. The detection and selection, for example at red pixel (2, 2), may be expressed, but not limited to, as follows:

If $|I_{2,2}^H - I_{2,1}^H| + |I_{2,2}^H - I_{2,3}^H|$ Threshold $< |I_{2,2}^V - I_{1,2}^V| + |I_{2,2}^V - I_{3,2}^V|$ (1a)

$G_{2,2} = G_{2,2}^J$ (1b)

If $|I_{2,2}^H - I_{2,1}^H| + |I_{2,2}^H - I_{2,3}^H| > |I_{2,2}^V - I_{1,2}^V| + |I_{2,2}^V - I_{3,2}^V| +$ Threshold (1a)

$G_{2,2} = G_{2,2}^V$ (1d)

Else $G_{2,2} = (G_{2,2}^H G_{2,2}^V)/2$ (1e)

If the condition (1a) has been met, that is, the horizontal difference is less than the vertical difference more than a predetermined threshold value, then the horizontal direction is selected for G interpolation, indicating that an edge exists horizontally. In other words, the interpolated green $G_{2,2}^H$ is selected as the green pixel value at (2, 2) as expressed in (1b). Alternatively, if the condition (1c) has been met, that is, the vertical difference is less than the horizontal difference more than a predetermined threshold value, then the vertical direction is selected for G interpolation, indicating that an edge exists vertically. In other words, the interpolated green $G_{2,2}^V$ is selected as the green pixel value at (2, 2) as expressed in (1d). If neither the conditions (1a) nor the condition (1c) has been met, the average of $G_{2,2}^H$ and $G_{2,2}^V$ is used as the green pixel value at (2, 2) as expressed in (1e).

While the exemplified expressions (1a)-(1e) illustrate the selection at red pixel, similar selection can be done at blue pixel.

Finally, the selected G pixel values (i.e., $G^H$ or $G^H$) at each red and blue pixel locations are used to update the interpolated R and B values (27 (FIG. 2) and step 35 (FIG. 3)). For example, the interpolated red value at green pixel (2, 3) is updated as follows:

$$R_{2,3}^{update} = (R_{2,2} + R_{2,4})/2 + G_{2,3} - \frac{1}{2}G_{2,2}^{H\ or\ V} - \frac{1}{2}G_{2,4}^{H\ or\ V}$$

where $G_{2,2}^{H\ or\ V}$ is substituted by $G_{2,2}^H$ (1b) if horizontal direction is selected, or substituted by $G_{2,2}^V$ (1d) if vertical direction is selected, or substituted by $G_{2,2}$ (1e) if neither direction is selected.

Accordingly, the embodiment of the present invention provides an efficient way for pattern interpolation, such as the Bayer pattern interpolation, which significantly reduces the color aliasing and improves the image quality especially along the edges and in the details of the image. Moreover, the computation effort required is less compared with conventional interpolations.

Although specific embodiments have been illustrated and described, it will be appreciated by those skilled in the art that various modifications may be made without departing from the scope of the present invention, which is intended to be limited solely by the appended claims.

What is claimed is:

1. Apparatus for pattern interpolation, comprising:
   an interpolator for generating horizontally interpolated green, subsequent red and blue pixel values, and generating vertically interpolated green, subsequent red and blue pixel values according to pixels received from a pattern color filter;
   a color space converter for converting a first color space of the horizontally and vertically interpolated pixel values into a second color space;
   a direction selector for selecting direction for the green value interpolation according to the horizontally and vertically interpolated pixel values in the second color space, wherein the horizontally interpolated green pixel value is determined as an interpolated green value when a horizontal direction is selected, and the vertically interpolated green pixel value is determined as the interpolated green value when a vertical direction is selected; and
   an update unit configured to determine interpolated red and blue pixel values according to the interpolated green pixel value.

2. The apparatus of claim 1, wherein the pattern color filter is Bayer pattern.

3. The apparatus of claim 1, wherein the first color space is RGB color space, and the second color space is YIQ color space.

4. The apparatus of claim 3, wherein the direction selector selects the direction for the green value interpolation according to I component of the YIP color space.

5. The apparatus of claim 1, further comprising an edge detector for detecting edge according to the horizontally and vertically interpolated pixel values in the second color space, and the direction selector selects the direction for the green value interpolation according to the detected edge.

6. A method for pattern interpolation, comprising:
using a processor to perform the steps of:
generating horizontally interpolated green, subsequent red and blue pixel values, and generating vertically interpolated green, subsequent red and blue pixel values according to pixels received from a pattern color filter;
converting a first color space of the horizontally and vertically interpolated pixel values into a second color space;
selecting direction for the green value interpolation according to the horizontally and vertically interpolated pixel values in the second color space, wherein the horizontally interpolated green pixel value is determined as an interpolated green value when a horizontal direction is selected, and the vertically interpolated green pixel value is determined as the interpolated green value when a vertical direction is selected; and
determining interpolated red and blue pixel values according to the interpolated green pixel value.

7. The method of claim 6, wherein the pattern color filter is Bayer pattern.

8. The method of claim 6, wherein the first color space is RGB color space, and the second color space is YIQ color space.

9. The method of claim 8, wherein the step of selecting the direction for the green value interpolation is done according to I component of the YIP color space.

10. The method of claim 6, further comprising a step of detecting edge according to the horizontally and vertically interpolated pixel values in the second color space, and the step of selecting the direction for the green value interpolation is done according to the detected edge.

* * * * *